US006748467B2

(12) United States Patent
Yamamoto (10) Patent No.: US 6,748,467 B2
(45) Date of Patent: Jun. 8, 2004

(54) HIGH SPEED DATA TRANSFER BETWEEN MAINFRAME STORAGE SYSTEMS

(75) Inventor: Akira Yamamoto, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 356 days.

(21) Appl. No.: 09/774,435

(22) Filed: Jan. 30, 2001

(65) Prior Publication Data

US 2002/0112079 A1 Aug. 15, 2002

(51) Int. Cl.[7] .............................................. G06F 13/14
(52) U.S. Cl. .................. 710/65; 711/112; 711/147; 370/244; 370/389
(58) Field of Search ............... 710/65; 370/244, 370/389; 711/112, 147

(56) References Cited

U.S. PATENT DOCUMENTS

| 5,155,845 | A | | 10/1992 | Beal et al. |
| 5,675,642 | A | * | 10/1997 | Sone .......................... 370/389 |
| 5,689,501 | A | * | 11/1997 | Takase et al. ............... 370/244 |
| 6,014,707 | A | * | 1/2000 | Miller et al. ................ 709/232 |
| 6,098,129 | A | | 8/2000 | Fukuzawa et al. |
| 6,505,273 | B2 | * | 1/2003 | Taroda et al. ............... 711/112 |
| 6,516,285 | B1 | * | 2/2003 | Hori et al. .................. 711/112 |
| 6,516,385 | B1 | * | 2/2003 | Satoyama et al. .......... 711/112 |
| 6,546,012 | B2 | * | 4/2003 | Kamo et al. ............. 370/395.1 |

OTHER PUBLICATIONS

"EMC Symmetrix DMX Series" www.emc.com/products/systems/DMX series.jsp, pp. 1–5.
"Data Replication Over IP Networks" Computer Network Technology, pp. 1–8.
"Working Draft American National Standard" Information Technology SCSI Block Commands —2 (SBC–2), May 31, 2003, Project T10/1417–D, pp. 1–145.

"EMC Symmetrix Remote Data Facility–Enterprise Storage Software Product Description Guide", EMC Corporation, Jun. 2000, pp. 1–36.

"Remote Disk Mirroring With Fibre Channel over IP From CNT and EMC" Computer Network Technology Corp., Sep. 2001.

"EMC News release–EMC Infrastructure Software delivers Unbridled Data Movement, Central Management", EMC Corporation, Apr. 25, 2000.

\* cited by examiner

Primary Examiner—Abdelmoniem Elamin
(74) Attorney, Agent, or Firm—Antonelli, Terry, Stout & Kraus, LLP (57) ABSTRACT

A local disk system in a local mainframe computer includes one or more local disk units. Data in at least one of the local disk units are backed-up to a designated remote disk unit in a remote disk system. Data transfer between the local disk system and the remote disk system occurs over a fixed block infrastructure to increase data transfer rates. Accordingly, variable-length data received in the local disk system and destined to be backed-up to a remote disk system are first converted to fixed-length data prior to transmission over the fixed block infrastructure. In the remote disk system, fixed-length data received over the fixed block infrastructure are converted back to variable-length format.

20 Claims, 10 Drawing Sheets

HIGH SPEED DATA TRANSFER BETWEEN MAINFRAME STORAGE SYSTEMS

BACKGROUND OF THE INVENTION

1. Field of the Invention

This invention relates generally to computer systems, and more particularly to methods and associated systems for transferring data between storage systems.

2. Description of the Background Art

For back-up purposes, data stored in a disk unit of a local mainframe computer system are copied to a remote storage device to prevent data loss in the event of a disaster such as a disk crash or facility shutdown. U.S. Pat. No. 6,098,129 to Fukuzawa et al. ("Fukuzawa") discloses a configuration for backing-up data from a mainframe computer system ("mainframe") to an open computer system. Although Fukuzawa discloses the use of low-cost open computer system storage devices for backing-up mainframe data, Fukuzawa does not disclose the use of another mainframe storage device for back-up.

Because mainframes are generally more reliable than other types of computer systems, data stored in the disk unit of a mainframe are ideally backed-up to a disk unit of another mainframe. Remote dual copy functions, which involve the backing-up of stored data from one computer system to another in real-time, have been performed between mainframes using the so-called Count-Key-Data ("CKD") protocol. The CKD protocol allows currently available mainframes to transfer data at a rate of approximately 17 MB/s (mega-bytes/second). To increase the amount of data that can be copied from one mainframe to another within a period of time, it is desirable to obtain a data transfer rate that is faster than what is currently obtainable using the CKD protocol.

SUMMARY

The present invention relates to a method and associated systems for transferring data between mainframe storage devices. While the invention is suitable for remote dual copy functions, the invention may be generally used in applications requiring data transfers.

In one embodiment of the invention, a local disk system of a local mainframe includes one or more local disk units. For back-up purposes, data in at least one of the local disk units are copied to a designated remote disk unit of a remote disk system. Data transfer between the disk units of the local and remote disk systems occurs over a fixed block infrastructure to increase data transfer rates. Accordingly, variable-length data received in the local disk system and destined to be backed-up to the remote disk system are first converted to fixed-length data prior to transmission over the fixed block infrastructure. In the remote disk system, fixed-length data received over the fixed block infrastructure are converted back to variable-length data.

In one embodiment of the invention, a method for performing data transfer between a local disk system and a remote disk system includes the steps of receiving variable-length data in the local disk system, converting the variable-length data to fixed-length data, sending the fixed-length data to the remote disk system, and converting the fixed-length data back to variable-length data in the remote disk system. The use of fixed-length data in the just mentioned method increases the data transfer rate between the local and the remote disk systems.

These and other features and advantages of the present invention will be readily apparent to persons of ordinary skill in the art upon reading the entirety of this disclosure, which includes the accompanying drawings and claims.

BRIEF DESCRIPTION OF THE DRAWINGS

The use of the same reference number in different drawings indicates the same or like components.

DETAILED DESCRIPTION

Figure 1:
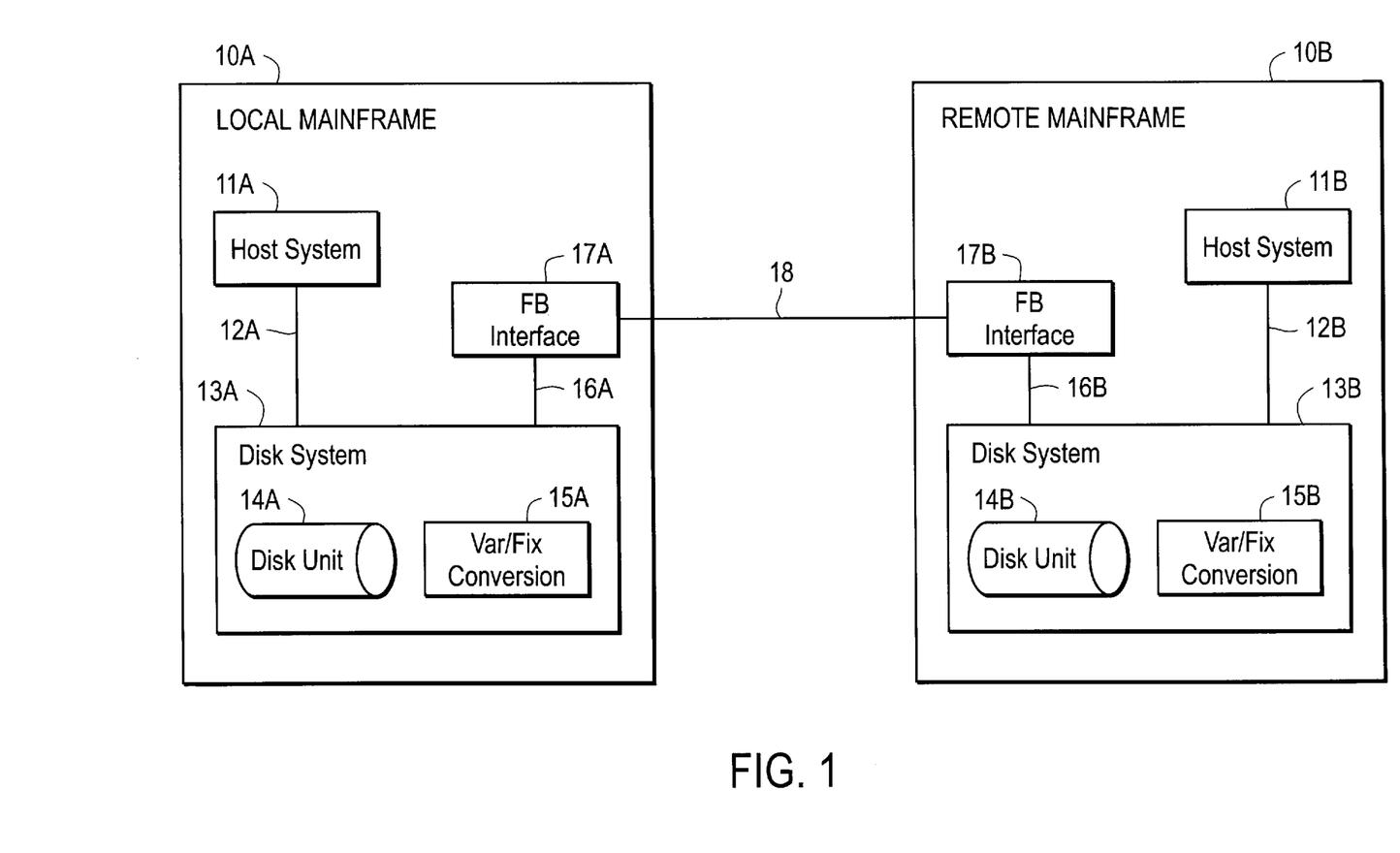
FIG. 1 shows a schematic diagram of a configuration for performing a remote dual copy function in an embodiment of the present invention.

Turning now to FIG. 1, there is shown a schematic diagram of a configuration for performing a remote dual copy function in accordance with an embodiment of the present invention. In a local mainframe 10A, data provided by a host system 11A are stored in a disk unit 14A of a disk system 13A. Host system 11A, which is the central processing unit of local mainframe 10A, conventionally reads from and writes to disk unit 14A using variable-length data commonly referred to as a "record". The well known Count-Key-Data ("CKD") protocol provides a format for representing variable-length data in a mainframe. In this embodiment, host system 11A provides variable-length data to disk system 13A via a CKD channel 12A.

In general, the control software overhead of protocols using variable-length data is higher than that of protocols using fixed-length data (also referred to as "fixed-length blocks" or "fixed blocks"). Thus, variable-length data protocols such as CKD are generally slower than fixed-length data protocols such as the Small Computer Systems Interface ("SCSI"). As a comparison, the data transfer rate of SCSI is 100 MB/s while that of CKD is only 17 MB/s. In the present invention, a fixed block channel 18 (e.g., SCSI channel) is employed to increase the data transfer rate between disk system 13A and disk system 13B. As shown in FIG. 1, disk system 13A includes a conversion function 15A for converting the variable-length data received from host system 11A to fixed-length data, which are then transported over channel 18 via a fixed block interface 17A (e.g., SCSI interface). In remote mainframe 10B, a fixed block interface 17B receives the fixed-length data from fixed block interface 17A. The fixed-length data are provided to disk system 13B, which includes a disk unit 14B for storage and a conversion function 15B for converting the fixed-length data back to variable-length data (and vice versa).

As is well known, a record stored in a disk unit of a mainframe is located by specifying a cylinder number, a head number, a sector number, and a record number. The cylinder number identifies a magnetic disk in the disk unit while the head number identifies a read/write head. The cylinder number and the head number, together, identify a track, which is a circular region on the magnetic disk where individual records are stored. Each track is further divided into fixed-angled regions commonly known as sectors. A sector provides the general location of a record on a track, and thus facilitates the searching of a record.

Figure 2:
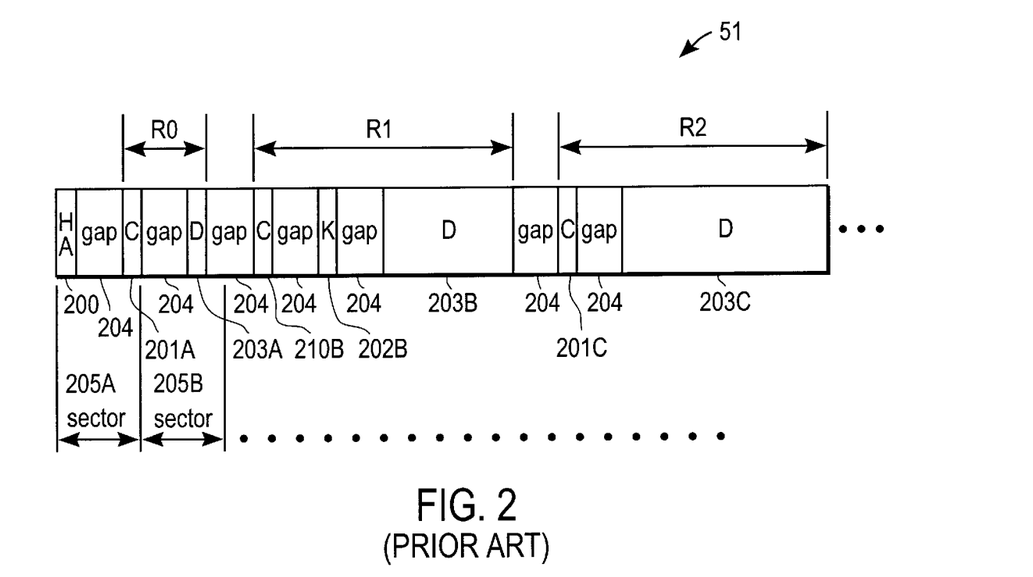
FIG. 2 illustrates the format of a track in Count-Key-Data (CKD) format.

FIG. 2 shows the format of a track 51 in CKD format. Track 51 includes a Home Address ("HA") 200, gaps 204, and records R0, R1, R2, etc. HA 200 is located at the beginning of track 51 and contains control information for accessing and identifying the track. As shown in FIG. 2, each field in track 51 is separated by a gap 204. HA 200 and gaps 204 have fixed lengths. Each record further includes a count field 201 (i.e., 201A, 201B ... ), a key field 202 (i.e., 202B, ... ), and a data field 203 (i.e., 203A, 203B, ... ). Count field 201 has a fixed length and contains record control information such as the record number, the length of key field 202, and the length of data field 203. Key field 202 includes key information for accessing the user or system data stored in data field 203. When count field 201 indicates that the length of key field 202 is zero, the record does not include a key field. To locate a record, the record number indicated in count field 201 is checked because the record numbers are not necessarily consecutive. That is, record R1 does not necessarily follow record R0, record R2 does not necessarily follow record R1, and so on.

Figure 3:
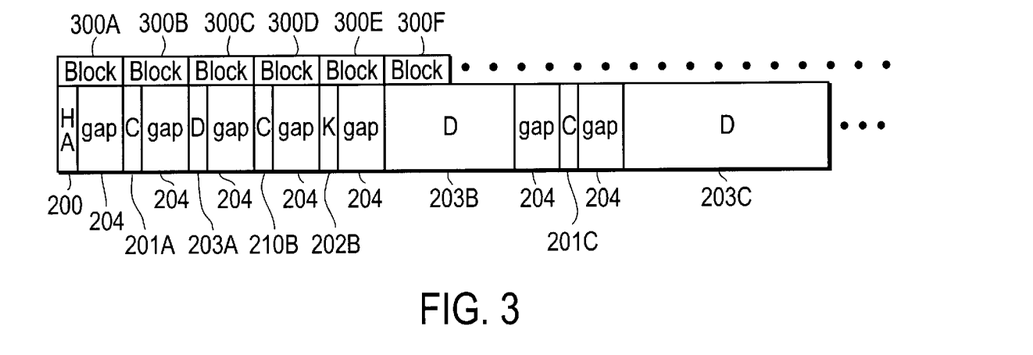
FIG. 3 illustrates the conversion of variable-length data to fixed-length data and vice versa in an embodiment of the present invention.

The conversion of variable-length data to fixed-length data, and vice versa, in accordance with an embodiment of the present invention is now described with reference to FIG. 3. As shown in FIG. 3, the contents of a track can be stored in a predetermined number of fixed-length blocks (i.e., fixed blocks) because the length of a track is fixed. Furthermore, the blocks that are in a sector 205 (i.e., 205A, 205B, ... ) are readily identified because the length of a sector is also fixed. That is, the fixed blocks for a particular sector can be found knowing the position of the sector relative to HA 200, the number of blocks per sector, and the number of sectors per track. In the example of FIG. 3, the contents of track 51 are stored in fixed blocks 300A, 300B, 300C, etc. Fixed block 300A is referred to as the "top block" and includes the contents of HA 200. Thus, the track represented by a set of fixed blocks 300 can be identified by looking up the track number indicated in the HA 200 stored in a fixed block 300A. The fixed blocks following fixed block 300A are consecutively arranged to facilitate the conversion of the fixed blocks back into CKD format. That is, fixed block 300B follows fixed block 300A, fixed block 300C follows fixed block 300B, and so on. Thus, fixed blocks 300B, 300C, 300D, etc. can be consecutively arranged to recreate the CKD formatted data once the matching fixed block 300A is found.

As can be appreciated by persons of ordinary skill in the art reading the present disclosure, fixed blocks 300 are suitable for transportation using a fixed block protocol such as SCSI. For example, each fixed block 300 can be assigned a unique SCSI logical block address (LBA) because the number of fixed blocks in a track and the number of tracks in a disk unit are fixed. Thus, assuming that each track has 100 fixed blocks, an LBA of 3521 may be used to identify the 22nd block in the 35th track.

Figure 4:
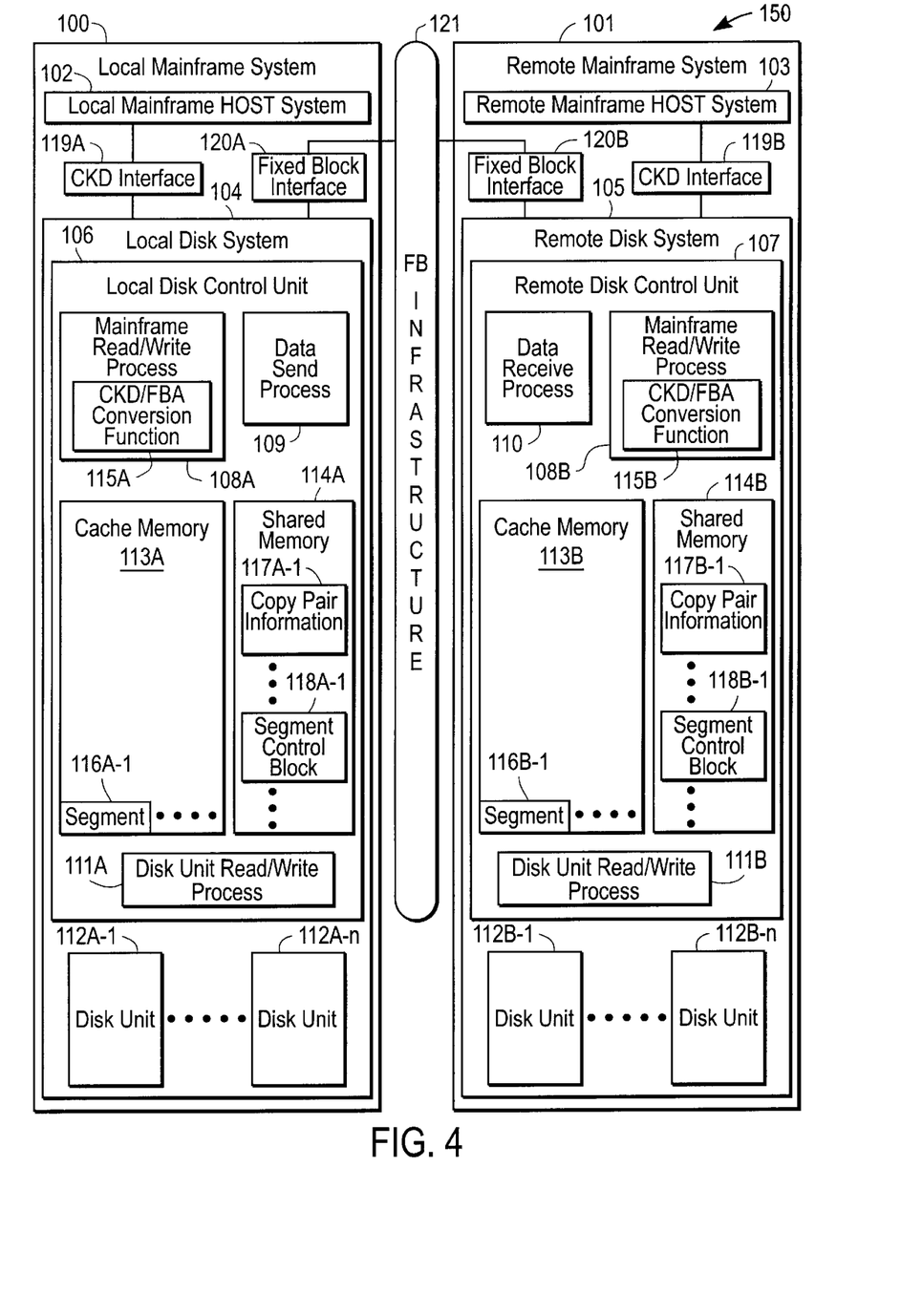
FIG. 4 shows a schematic diagram of a configuration for performing a remote dual copy function in another embodiment of the present invention.

FIG. 4 shows a schematic diagram of a configuration 150 for performing a remote dual copy function in another embodiment of the present invention. As shown in FIG. 4, a local host system 102, which is the central processing unit of a local mainframe 100, provides CKD formatted data to a local disk system 104 via a CKD interface 119A. Local disk system 104 further includes disk units 112A (i.e., 112A-1, 112A-2, ... ) where data are stored, and a local disk control unit 106 for controlling disk units 112A.

Local disk control unit 106 includes a cache memory 113A where data that are in transit or frequently accessed are temporarily stored before being written to a disk unit 112A. Data in cache memory 113A are organized in segments (i.e., segments 116A-1, 116A-2, ... ), with each segment having enough space to hold the entire contents of a single track.

Local disk control unit 106 also includes a mainframe read/write process 108A for processing disk read and write commands received from local host system 102, a data send process 109 for sending data to remote mainframe 101, and a disk unit read/write process 111A for transferring data between disk units 112A and cache memory 113A. In this disclosure, the term "process" includes hardware, software, and/or firmware for performing the indicated function. All of the just mentioned processes can access a shared memory 114A, which contains multiple copy pair information 117A (i.e., 117A-1, 117A-2, ... ) and segment control blocks 118A (i.e., 118A-1, 118A-2, ... ). A CKD/FBA conversion function 115A, which is generally available to all processes of local disk control unit 106, is called by read/write process 108A to convert CKD formatted data to fixed blocks and vice versa. In one embodiment, CKD/FBA conversion function 115A employs the technique described in connection with FIG. 3.

Figure 5:
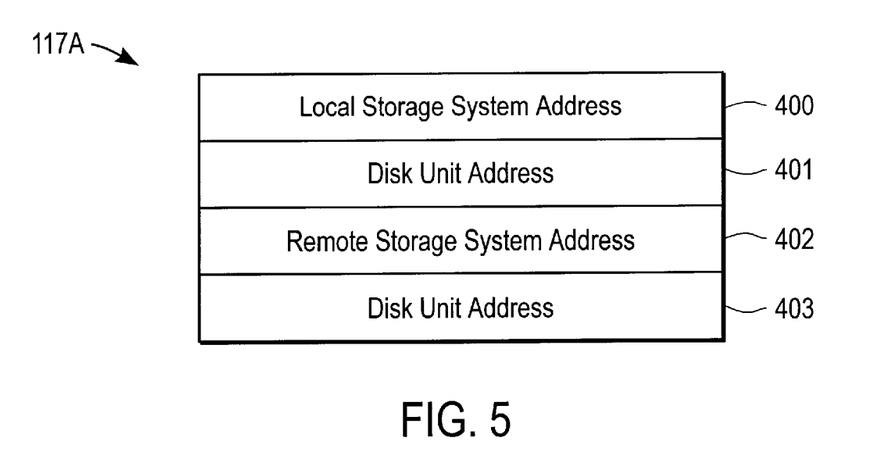
FIG. 5 illustrates the structure of a copy pair information in an embodiment of the present invention.

A copy pair information 117A identifies a disk unit in remote mainframe 101 that is designated as a back-up of a disk unit in local mainframe 100. FIG. 5 shows the structure of a copy pair information 117A. Referring to FIG. 5, a local storage system address 400 specifies a local disk system in local mainframe 100 (e.g., local disk system 104). A disk unit address 401 specifies a disk unit in the local disk system. Similarly, a remote storage system address 402 and a disk unit address 403 specify a remote disk system in remote mainframe 101 (e.g., remote disk system 105) and a disk unit in the remote disk system, respectively. The contents of the disk unit specified in disk unit address 401 are copied to the disk unit specified in disk unit address 403 during a remote dual copy function.

Figure 6:
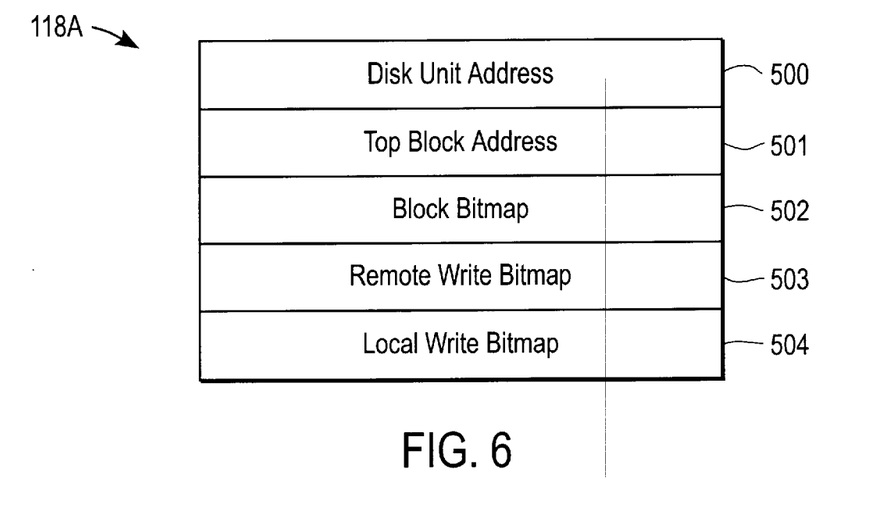
FIG. 6 illustrates the structure of a segment control block in an embodiment of the present invention.

In configuration 150 shown in FIG. 4, each segment control block 118A contains information relating to a corresponding segment 116A stored in cache memory 113A. FIG. 6 shows the structure of a segment control block 118A in configuration 150. A disk unit address 500 specifies a disk unit 112A where storage space is allocated for the segment 116A. As mentioned, a segment 116A has enough space to hold the entire contents of the allocated track. If cache memory 113A is organized in terms of fixed blocks, as is the case in configuration 150, a segment 116A has enough space to hold all the fixed blocks of a track. A top block address 501 indicates the top block address of the track for which a segment 116A is allocated, and can thus be used to locate the segment 116A.

As shown in FIG. 6, a segment control block 118A also includes a block bitmap 502, a remote write bitmap 503, and a local write bitmap 504. Each bit of bitmaps 502, 503, and 504 corresponds to a block of the segment 116A identified by top block address 501. Accordingly, the number of bits of each of the just mentioned bitmaps is equal to the number of blocks in a segment 116A. Each bit of block bitmap 502 indicates whether the corresponding block is in cache memory 113A; i.e., when a bit of block bitmap 502 is ON, the block which corresponds to that bit is in a segment 116A in cache memory 113A. The bits of remote write bitmap 503 indicate whether the corresponding blocks need to be written to a disk unit in remote disk system 105. That is, when a bit of remote write bitmap 503 is ON, the block which corresponds to that bit is to be transmitted to remote disk system 105 of remote mainframe 101. Similarly, each bit of local write bitmap 504 indicates whether the corresponding block needs to be written to a disk unit of local disk system 104.

Referring to FIG. 4, a fixed block interface 120A transports fixed blocks to remote mainframe 101 over a fixed block infrastructure 121. In one embodiment, interface 120A is a SCSI interface, and infrastructure 121 is a SCSI infrastructure that includes SCSI cables, line drivers, adapters, repeaters, etc. To process the fixed blocks received over infrastructure 121, remote disk system 105 includes components that mirror those of local disk system 104. That is, remote disk system 105 also has a data receive process, a mainframe read/write process, a CKD/FBA conversion function, a cache memory, a shared memory, a disk unit read write process, and a CKD interface that are similar to those in remote disk system 105. In the present disclosure (including in FIG. 4), the same or like components are labeled with the same reference numeral. For example, shared memory 114A of local disk system 104 is similar to shared memory 114B of remote disk system 105.

Figure 7A:
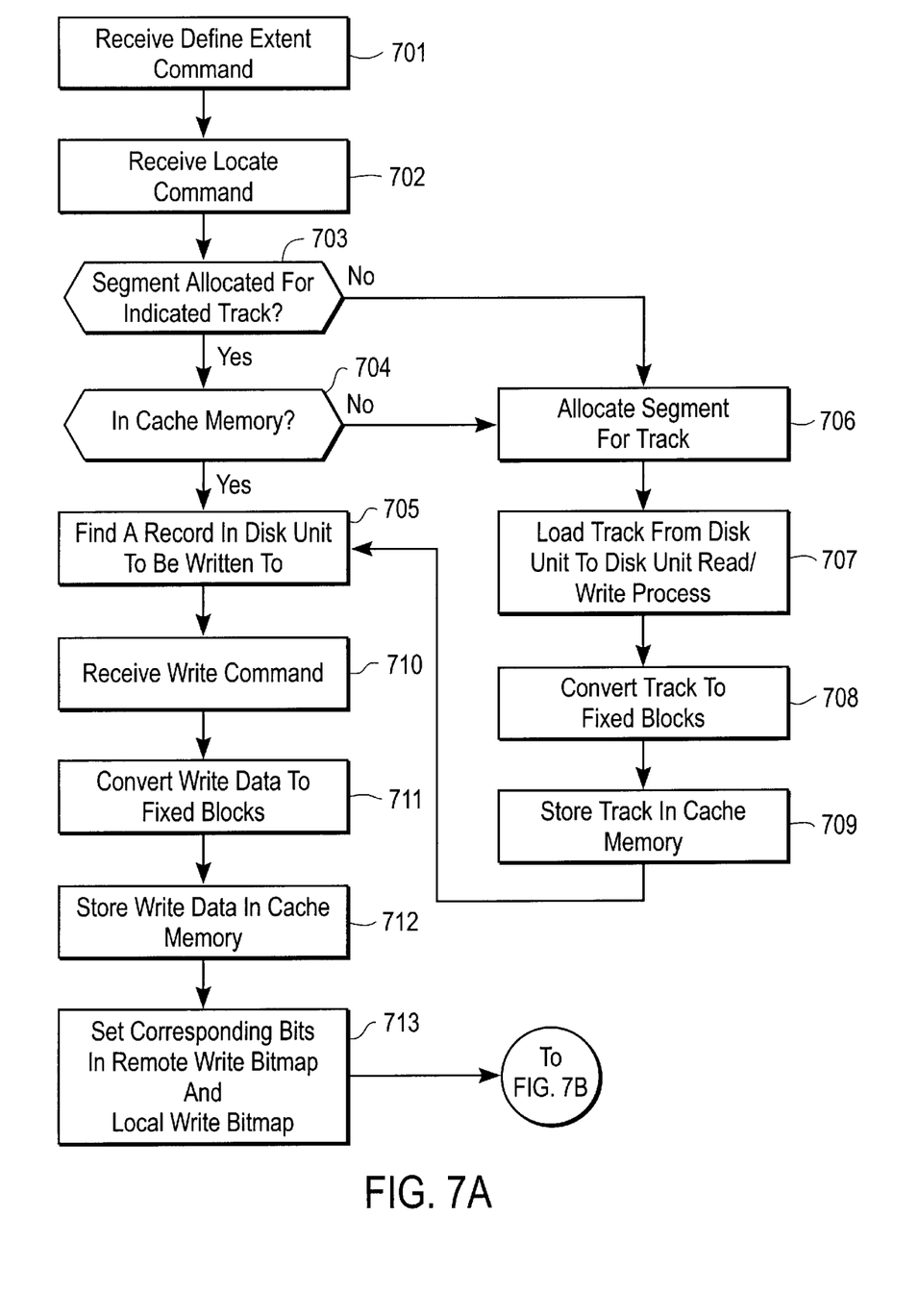
FIGS. 7A and 7B show a method for performing a remote dual copy function in an embodiment of the present invention.

A method for performing a remote dual copy function in accordance with an embodiment of the present invention is now described with reference to FIG. 7A, FIG. 7B, and FIG. 4. Referring to FIG. 7A, a remote dual copy function is initiated when read/write process 108A receives a Define Extent command from local host system 102 (step 701). As is conventional, the Define Extent command includes information for processing forthcoming Locate and Read/Write commands such as cache memory utilization mode etc. After receiving the Define Extent command, read/write process 108A then receives a Locate Command (step 702). As is conventional, the Locate command specifies a record to access by providing a cylinder number, a head number, a sector number, and a record number. The cylinder number and the head number, together, identify a particular track in a disk unit. To determine if there is a segment 116A allocated for the track specified in the Locate command, read/write process 108A checks the top block addresses 501 of the segment control blocks 118A (step 703). Note that read/write process 108A may utilize CKD/FBA conversion function 115A to convert CKD formatted data to fixed blocks and vice versa.

If a segment 116A is allocated for the track, read/write process 108A checks the block bitmap 502 of the corresponding segment control block 118A to determine if fixed blocks belonging to the sector specified in the Locate command are in cache memory 113A (step 704).

If the blocks corresponding to the sector number are not in cache memory 113A or if a segment 116A is not allocated for the track specified in the Locate Command, a segment 116A and corresponding segment control block 118A are created for the track (step 706). Thereafter, the contents of the track are loaded from the disk unit 112A specified in the Locate command to disk unit read/write process 111A (step 707), converted to fixed blocks (step 708), and then stored in cache memory 113A in the allocated segment 116A (step 709).

Once it is established that the contents of the track are in cache memory 113A, read/write process 108A finds a record in a disk unit 112A where write data from a forthcoming Write command is to be written (step 705). Subsequently, read/write process 108A receives the Write command that goes with the previously received Define Extent and Locate commands (step 710). Read/write process 108 converts the write data that accompany the write command from CKD format to fixed blocks (step 711), stores the converted write data to cache memory (step 712), and then sets the corresponding bits in remote write bitmap 503 and local write bitmap 504 (step 713). At a later time, disk unit read/write process 111A conventionally writes the fixed blocks identified in local write bitmap 504 to their respective disk units 112A.

Figure 7B:
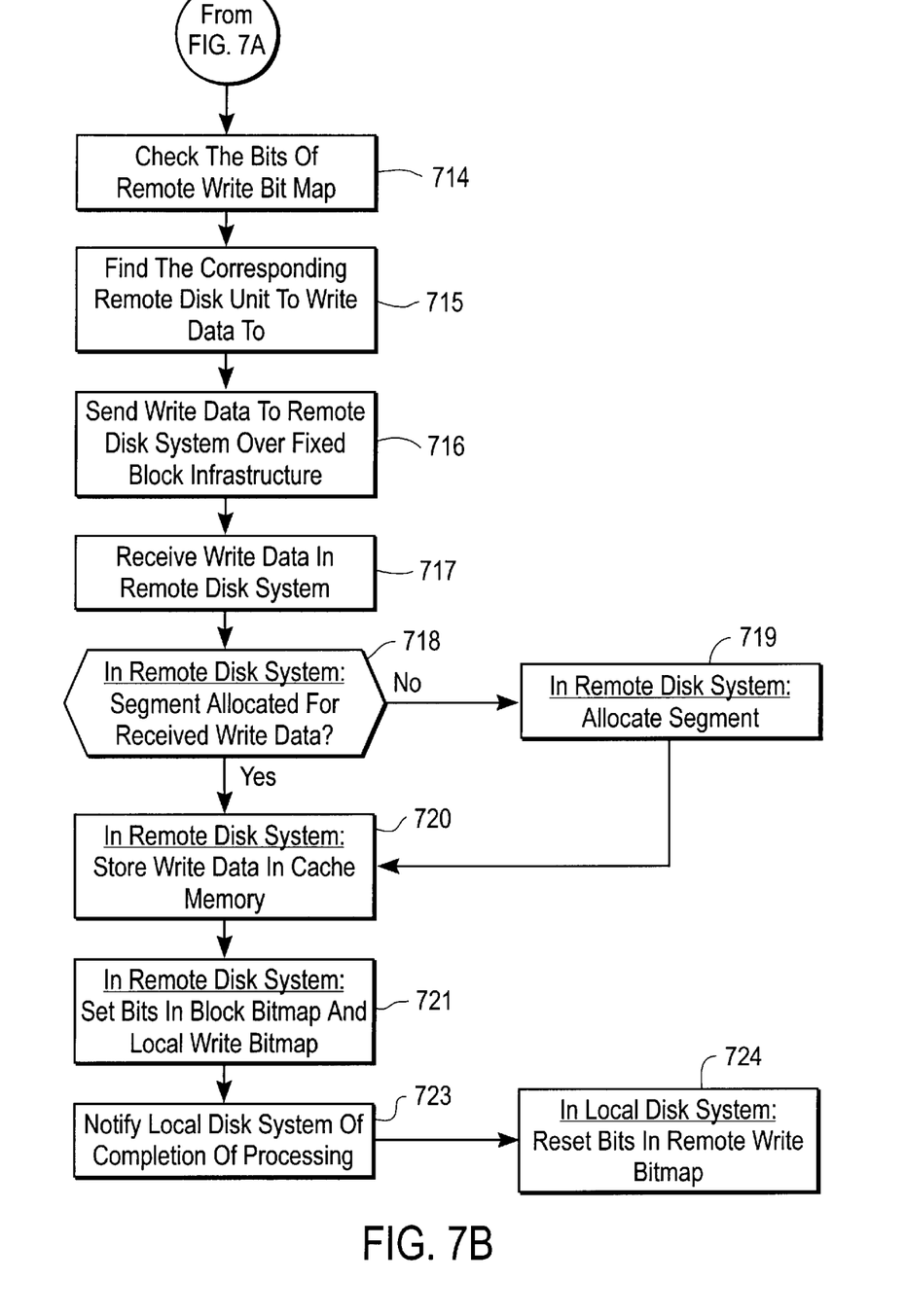

Continuing with step 714 shown in FIG. 7B, data send process 109 checks the bits of the remote write bitmaps 503 in shared memory 114A to find the fixed blocks that need to be sent to remote disk system 105. Data send process 109 uses the information in a copy pair information 117A to determine the remote disk unit designated to receive the fixed blocks (step 715). Data send process 109 sends the fixed blocks to remote disk system 105 via fixed block interface 120A and over fixed block infrastructure 121 (step 716). Because fixed block interface 120A, fixed block interface 120B, and infrastructure 121 are based on SCSI in this embodiment, each fixed block is assigned a unique logical block address.

In remote disk system 105, a data receive process 110 receives the fixed blocks via a fixed block interface 120B (step 717). Data receive process 110 then checks the top block addresses of segment control blocks 118B to determine if there is a segment 116B allocated for each received fixed block (step 718). If a segment 116B is not allocated, a segment 116B and a corresponding segment control block 118B are created for the fixed block (step 719). Data receive process 110 then stores the fixed blocks in their respective segments 116B (step 720). Thereafter, data receive process 110 sets the corresponding bits in the block bitmap and local write bitmap of the segment control block 118B (step 721), and notifies data send process 109 that the fixed blocks have been received and processed in remote disk system 105 (step 723). In response, data send process 109 resets the corresponding bits in the remote write bitmap 503 in local disk system 104. At a later time, disk unit read/write process 111B in remote disk system 105 conventionally writes the fixed blocks identified in the local write bitmap of the segment control block 118B to their respective disk units 112B.

Figure 8A:
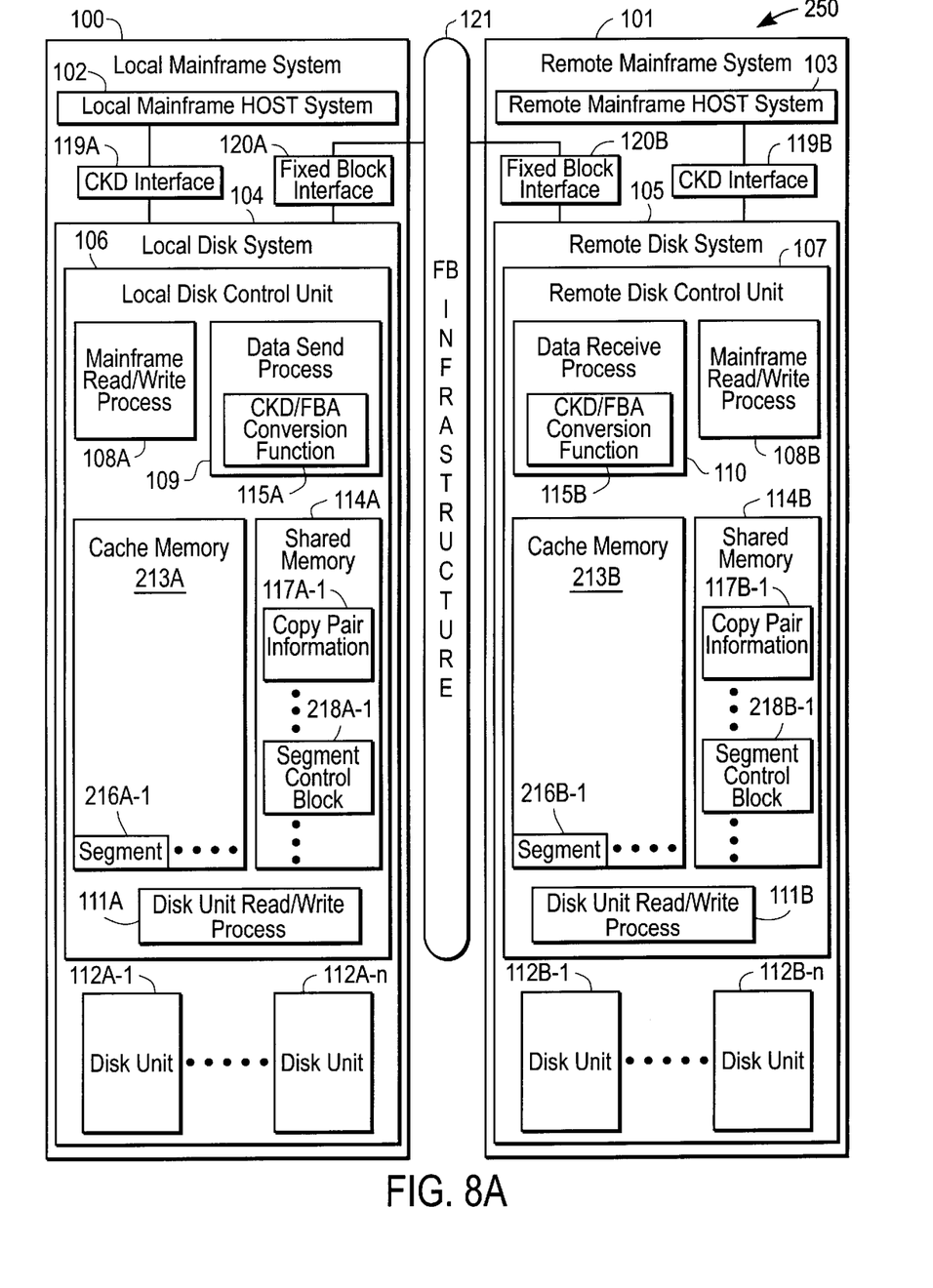
FIG. 8A shows a schematic diagram of a configuration for performing a remote dual copy function in another embodiment of the present invention.

FIG. 8A shows a schematic diagram of a configuration 250 for performing a remote dual copy function in another embodiment. In contrast to configuration 150, cache memory 213 (i.e., 213A, 213B), segment 216 (i.e., 216A, 216B), and segment control block 218 (i.e., 218A, 218B) of the mainframes in configuration 250 are configured to process CKD formatted data. That is, each segment 216 of a cache memory 213 has enough space to hold the records of a single track in CKD format.

Figure 8B:
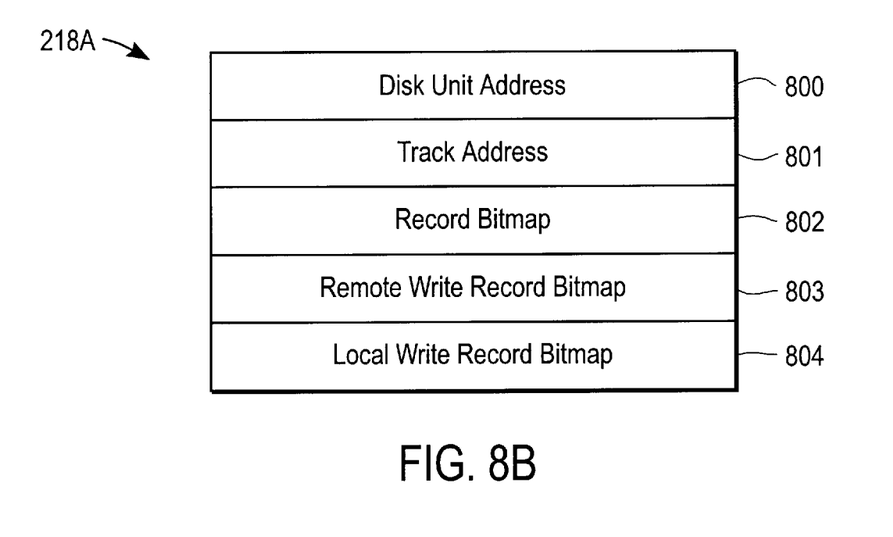
FIG. 8B illustrates the structure of a segment control block in another embodiment of the present invention.

In configuration 250, each segment 216 has a corresponding segment control block 218. FIG. 8B shows the structure of a segment control block 218 in configuration 250. As shown in FIG. 8B, a disk unit address 800 specifies a disk unit 112 where storage space is allocated for the segment 216. A track address 801 contains the address of the track allocated for the segment 216.

A segment control block 218 further includes a record bitmap 802, a remote write record bitmap 803, and a local write record bitmap 804. Each bit of the just mentioned bitmaps corresponds to a record stored in the corresponding segment 216. Accordingly, the number of bits of each of the just mentioned bitmaps is equal to the maximum number of records in a track.

Record bitmap 802 indicates whether a record is in a segment 216. When a bit of record bitmap 802 is ON, the record that corresponds to that bit is in a corresponding segment 216.

Remote write record bitmap 803 indicates whether a record in the corresponding segment 216 needs to be written to a disk unit in the remote disk system (which is identified in a copy pair information 117 similar to that used in configuration 150). When a bit in remote write record bitmap 803 is on, the record that corresponds to that bit is transmitted to the remote disk system.

Local write record bitmap 804 indicates whether a record in the corresponding segment 216 needs to be written to a disk unit in the local disk system. When a bit of local write record bitmap 804 is on, the record that corresponds to that bit is written to a disk unit in the local disk system.

In configuration 250, CKD formatted data from local host system 102 are not converted to fixed blocks until the data are ready to be transmitted to remote disk system 105. Accordingly, data send process 109 calls CKD/FBA conversion function 115A to convert the CKD formatted data to fixed blocks before handing the data to fixed block interface 120A. In remote disk system 105, data receive process 110 calls CKD/FBA conversion function 115B to convert the fixed blocks received over fixed block infrastructure 121 back to CKD format.

Figure 9:
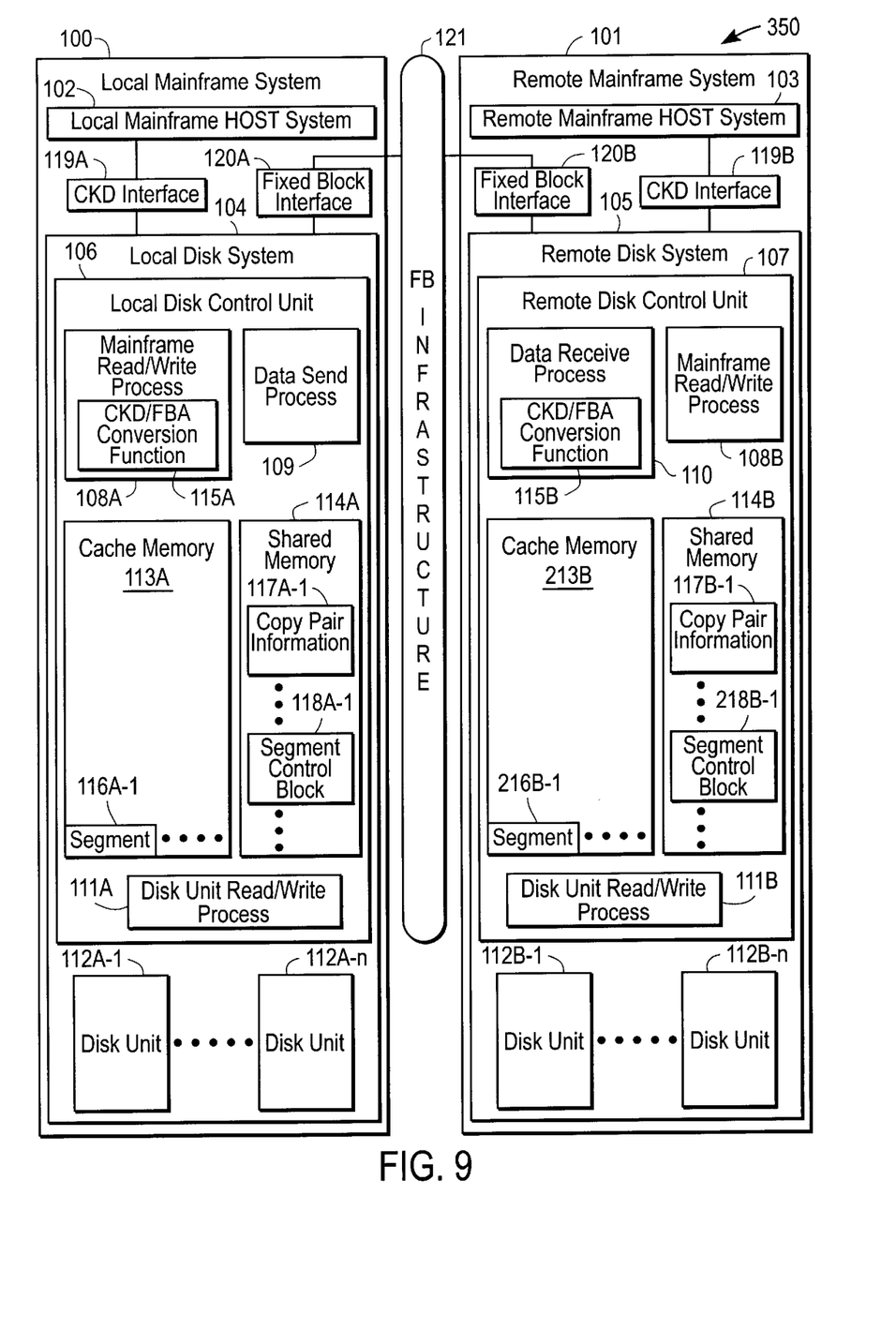
FIGS. 9 and 10 show schematic diagrams of configurations for performing a remote dual copy function in other embodiments of the present invention.
Figure 10:
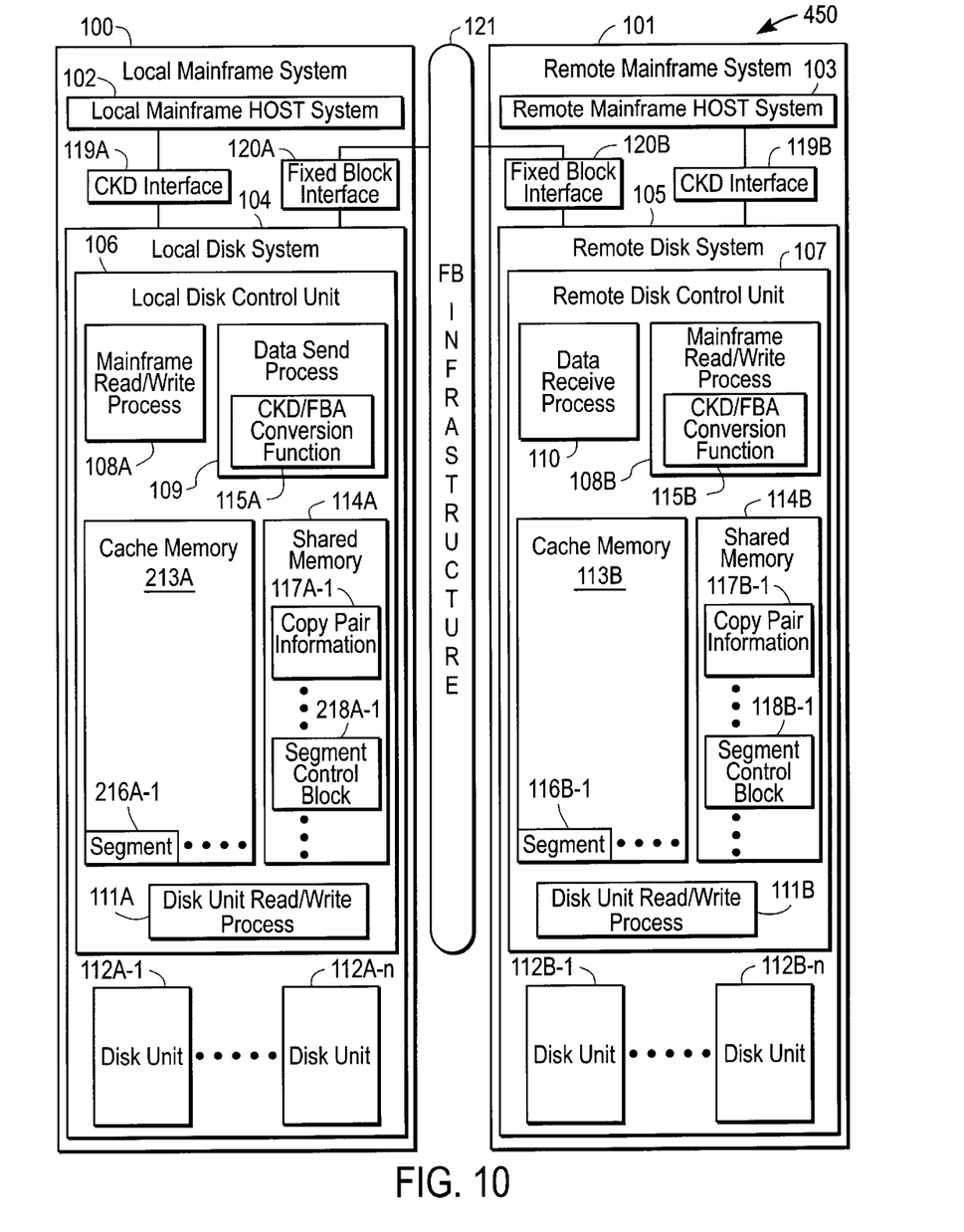

As is evident from the foregoing, configuration 250 and configuration 150 are similar except for the use of CKD formatted data in the cache memory of configuration 250. Persons of ordinary skill in the art will appreciate that the present invention can be employed regardless of the cache memory management scheme. For example, FIG. 9 shows a configuration 350 where the local disk system uses a fixed block cache management scheme similar to that used in the local disk system of configuration 150, whereas the remote disk system uses a CKD cache management scheme similar to that used in the remote disk system of configuration 250. Similarly, FIG. 10 shows a configuration 450 where the local disk system uses a CKD cache management scheme similar to that used in the local disk system of configuration 250, whereas the remote disk system uses a fixed block cache management scheme similar to that used in the remote disk system of configuration 150.

A method and associated systems for transferring data between storage systems for mainframe computers have been disclosed. While specific embodiments have been provided, it is to be understood that these embodiments are for illustration purposes and not limiting. Many additional embodiments will be apparent to persons of ordinary skill in the art reading this disclosure. For example, while the invention is suitable for use in remote dual copy functions, the invention is not so limited and may be generally used in applications requiring data transfer between storage systems. Thus, the present invention is limited only by the following claims.

What is claimed is:

1. A system for transferring data between storage systems comprising:

a local disk system capable of converting data in variable-length data format to fixed blocks, the local disk system having a local disk unit;

a local fixed block I/O interface coupled to receive fixed blocks from the local disk system;

a remote fixed block I/O interface coupled to receive fixed blocks from the local fixed block I/O interface; and a remote disk system capable of converting fixed blocks from the remote fixed block I/O interface to data in the variable-length data format, the remote disk system having a remote disk unit assigned to store data that are also destined for storage in the local disk unit.

2. The system of claim 1 further comprising a local cache memory in the local disk system and a remote cache memory in the remote disk system.

3. The system of claim 2 wherein the local cache memory and the remote cache memory are configured to store fixed blocks.

4. The system of claim 2 wherein the local cache memory and the remote cache memory are configured to store variable-length data.

5. The system of claim 1 wherein the local and remote fixed block interfaces conform to the Small Computer Systems Interface (SCSI) convention.

6. A method for transferring data between storage systems comprising:

receiving first data in variable-length data format in a local storage system, the first data being destined for storage in a local storage unit of the local storage system and a remote storage unit of a remote storage system;

converting the first data to second data in fixed-length data format in the local storage system;

sending the second data to the remote storage system over a fixed block I/O channel; and converting the second data back to data in the variable-length data format in the remote storage system.

7. The method of claim 6 wherein the variable-length data are in Count-Key-Data (CKD) format.

8. The method of claim 6 wherein the fixed-length data are in Small Computer Systems Interface (SCSI) format.

9. The method of claim 6 wherein the variable-length data are converted to fixed-length data by organizing the variable-length data into a predetermined number of fixed blocks.

10. The method of claim 6 further comprising: storing the variable-length data in a cache memory in the local storage system prior to converting the variable-length data to fixed-length data.

11. The method of claim 6 further comprising: storing the fixed-length data in a cache memory in the local storage system prior to sending the fixed-length data to the remote storage system.

12. The method of claim 6 further comprising: storing the fixed-length data in a cache memory in the remote storage system prior to converting the fixed-length data back to variable-length data.

13. The method of claim 6 wherein the local storage system is a disk system and the local storage unit is a disk unit.

14. A system for transferring data between storage systems comprising:

a local storage system coupled to a local host system, the local storage system being capable of converting data in variable-length data format received from the local host system to fixed blocks, the local storage system having a local storage unit;

a local fixed block I/O interface coupled to receive fixed blocks from the local storage system;

a remote fixed block interface coupled to receive fixed blocks from the local fixed block I/O interface; and a remote storage system coupled to receive fixed blocks from the remote fixed block I/O interface, the remote storage system being capable of converting fixed blocks from the remote fixed block I/O interface to data in the variable-length data format and vice versa, the remote storage system having a remote storage unit designated as a back-up for the local storage unit.

15. The system of claim 14 wherein the local storage system includes a local cache memory configured to store fixed blocks.

16. The system of claim 14 wherein the local storage system includes a local cache memory configured to store variable-length data.

17. The system of claim 14 wherein the local and remote fixed block interfaces are Small Computer Systems Interface (SCSI) interfaces.

18. The system of claim 14 wherein the variable-length data received from the local host system are in Count-Key-Data (CKD) format.

19. The system of claim 14 further comprising: a shared memory in the local storage system, the shared memory containing information about data stored in a cache memory in the local storage system.

20. The system of claim 14 further comprising: a shared memory in the remote storage system, the shared memory containing information about data stored in a cache memory in the remote storage system.

* * * * *